Patented Apr. 20, 1926.

1,581,902

UNITED STATES PATENT OFFICE.

JAMES G. E. WRIGHT, OF ALPLAUS, NEW YORK, ASSIGNOR TO GENERAL ELECTRIC COMPANY, A CORPORATION OF NEW YORK.

POLYHYDRIC ALCOHOL-ORGANIC ACID RESINOUS CONDENSATION PRODUCTS.

No Drawing.   Application filed July 5, 1924.  Serial No. 724,296.

*To all whom it may concern:*

Be it known that I, JAMES G. E. WRIGHT, a subject of the British Empire, residing at Alplaus, in the county of Schenectady, State of New York, have invented certain new and useful Improvements in Polyhydric Alcohol-Organic Acid Resinous Condensation Products, of which the following is a specification.

The present invention relates to the class of resinous condensation products formed by the chemical reaction of a polyhydric alcohol, such for example as glycerine, and a polybasic acid, or its anhydride, as for example, phthalic anhydride. The resin formed by the interaction of glycerine and phthalic anhydride has become known as glyptal (see Synthetic Resins and Their Plastics by Ellis, pages 293 to 298).

These resinous materials are formed by a reaction between a hydroxyl group of the alcohol, and a carboxyl group of the acid, splitting off water, and forming a soft ester-like product, which is fusible and soluble. When the reaction product is heated, the reaction continues with the elimination of water, and the resin is finally converted to a hard, infusible, insoluble state. Owing to the complexity of the molecules, the product is not a simple ester at any stage but a structureless substance of high molecular weight. Although the reaction may be continued by heating alone, the reaction gradually slows up as long as any free hydroxyl and carboxyl groups remain. It requires under ordinary working conditions not only a long time, but also a relatively high temperature to proceed to the final or infusible stage.

When resins of the ester type are utilized by applying the resin as a cement, impregnant, varnish or the like in the soluble, fusible state and then converting the resin by heating to the hard, tough, insoluble, infusible state, it is desirable to hasten the hardening so as not to unduly prolong manufacturing operations.

It is the object of my invention to accelerate the reaction which occurs when resins of the glyptal type are converted to the stable, or hardened state in which the resin has lost its previous solubility and fusibility.

I have discovered that the hardening of glyptal resins may be hastened by adding to the resin certain substances which act as dehydration catalysts, for example, calcium oxide, magnesium oxide, zinc oxide, or certain metals in a finely divided state, such as, iron reduced from a finely divided oxide by hydrogen, or finely divided zinc.

My invention may be illustrated by a cement in which the binding material consists of glyptal. In the preparation of this cement a preponderant amount of an inert filler, such as marble dust is mixed, with a lesser amount of glyptal and a relatively very small amount of accelerator. For example, I have obtained good results from the following mixture by weight together with enough solvent to produce the required consistency.

73 parts marble dust, 16 parts glyptal, 1 part of catalyst, for example iron reduced by hydrogen.

As a solvent acetone or a mixture of acetone and alcohol may be used.

This cement when heated condenses, or hardens, to the infusible state in about one third the time required for a given temperature in the absence of an accelerator. For example, in cementing operations requiring speed, the resin in the above mixture may be hardened in about one to two minutes at a temperature of about 240° C., depending somewhat on the bulk of the mixture and other conditions.

Apparently the accelerator forms some sort of loose chemical compound which splits off water more easily than the reacting compounds. The accelerator does no harm in the cured material. Of course, when the final product is to be used for electrical insulation the non-conducting oxides are preferred as accelerators.

What I claim as new and desire to secure by Letters Patent of the United States is:—

1. The method of accelerating the conversion to the infusible state of a polyhydric alcohol-organic acid initial condensation product which consists in heating said product while admixed with a small quantity of a finely divided material comprising a metal as an elementary constituent.

2. The method of accelerating the hardening of a polyhydric alcohol-organic acid initial condensation product by heating which consists in incorporating therewith finely divided metal and heating to a hardening temperature.

3. A composition of matter comprising a polyhydric alcohol-organic acid initial condensation product and a finely divided solid material capable of accelerating the conversion thereof by heat to the infusible state.

4. A composition of matter comprising a resinous condensation product of a polyhydric alcohol and a polybasic acid and finely divided iron.

5. A composition of matter comprising a resinous condensation product of glycerine and phthalic anhydride and finely divided iron, the former material being largely in excess.

In witness whereof, I have hereunto set my hand this 3rd day of July, 1924.

JAMES G. E. WRIGHT.